United States Patent
Ben Henda et al.

(10) Patent No.: US 11,895,735 B2
(45) Date of Patent: Feb. 6, 2024

(54) FULLY QUALIFIED DOMAIN NAME HANDLING FOR SERVICE INTERACTIONS IN 5G

(71) Applicant: Telefonaktiebolaget LM Ericsson (publ), Stockholm (SE)

(72) Inventors: Noamen Ben Henda, Vällingby (SE); Juha Kujanen, Keuruu (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 454 days.

(21) Appl. No.: 17/288,426

(22) PCT Filed: Nov. 4, 2019

(86) PCT No.: PCT/EP2019/080046
§ 371 (c)(1),
(2) Date: Apr. 23, 2021

(87) PCT Pub. No.: WO2020/094547
PCT Pub. Date: May 14, 2020

(65) Prior Publication Data
US 2022/0030413 A1 Jan. 27, 2022

Related U.S. Application Data

(60) Provisional application No. 62/755,800, filed on Nov. 5, 2018.

(51) Int. Cl.
*H04W 8/02* (2009.01)
*H04L 9/40* (2022.01)
(Continued)

(52) U.S. Cl.
CPC ........... *H04W 8/02* (2013.01); *H04L 61/4511* (2022.05); *H04L 63/0281* (2013.01);
(Continued)

(58) Field of Classification Search
None
See application file for complete search history.

(56) References Cited

U.S. PATENT DOCUMENTS

2015/0113172 A1 4/2015 Johnson et al.
2019/0260803 A1* 8/2019 Bykampadi ........... H04W 12/10
(Continued)

FOREIGN PATENT DOCUMENTS

WO WO-2012010209 A1 * 1/2012 ....... H04L 29/12066
WO WO-2019158028 A1 * 8/2019

OTHER PUBLICATIONS

International Search Report and Written Opinion of the International Searching Authority for PCT International Application No. PCT/EP2019/080046 dated Feb. 4, 2020.
(Continued)

*Primary Examiner* — Chris Parry
*Assistant Examiner* — Abderrahmen Chouat
(74) *Attorney, Agent, or Firm* — Sage Patent Group

(57) ABSTRACT

A method by a first security edge protection proxy (SEPP) for security edge protection of messages being communicated between first and second communications networks of a communications system. The method receives, from a first network function of the first communications network, a first message containing an address identifying a second network function which is located in the second communications network. The method receives, from a second SEPP operating to protect communications with the second communications network, a second message containing a fully qualified domain name, FQDN, reference for a combination of the second SEPP and the second network function. The method stores the FQDN reference for the combination of the second SEPP and second network function in a label-to-FQDN mapping data structure with a logical association to a substitute locally-unique label, and sends a third mes- (Continued)

sage containing the substitute locally-unique label to the first network function.

17 Claims, 16 Drawing Sheets

(51) Int. Cl.
*H04W 48/16* (2009.01)
*H04L 61/4511* (2022.01)
*H04W 84/04* (2009.01)
*H04W 88/16* (2009.01)

(52) U.S. Cl.
CPC .......... *H04L 63/166* (2013.01); *H04W 48/16* (2013.01); *H04W 84/042* (2013.01); *H04W 88/16* (2013.01)

(56) References Cited

U.S. PATENT DOCUMENTS

| | | | |
|---|---|---|---|
| 2020/0344604 A1* | 10/2020 | He | H04W 12/088 |
| 2021/0250186 A1* | 8/2021 | Bykampadi | H04L 9/3273 |
| 2021/0321303 A1* | 10/2021 | Nair | H04L 63/0281 |
| 2023/0007475 A1* | 1/2023 | He | H04W 12/06 |

OTHER PUBLICATIONS

SA3, "Reply LS to LS Out on TLS and inter PLMN routing," C4-187308, 3GPP TSG CT WG4 Meeting #86-bis, Vilnius, Lithuania, Oct. 15-19, 2018 / S3-182630, 3GPP TSG-SA WG3 Meeting #92, Dalian (China), Aug. 20-24, 2018, 2 pages.

3GPP TR 33.855 V1.2.0, "3rd Generation Partnership Project; Technical Specification Group Services and System Aspects; Security Aspects; Study on security aspects of the 5G Service Based Architecture (SBA) (Release 16)," Technical Report, Sep. 2018, 50 pages.

3GPP TS 33.501 V15.2.0, "3rd Generation Partnership Project; Technical Specification Group Services and System Aspects; Security architecture and procedures for 5G system (Release 15)," Technical Specification, Sep. 2018, 175 pages.

Nokia et al., "Security aspects of SEPP to IPX communication," S3-183009, 3GPP TSG SA WG3 (Security) Meeting #92 ad-hoc, Sep. 24-28, 2018, Harbin (China), 5 pages.

Ericsson, "New option to Solution #8 Inter PLMN routing and TLS," S3-183723, 3GPP TSG SA WG3 (Security) Meeting #93, Nov. 12-16, 2018, Spokane (US), 3 pages.

Nokia et al., "Issue with wildcard certificates," S3-183546, 3GPP TSG SA WG3 (Security) Meeting #93, Nov. 12-16, 2018, Spokane (US), 2 pages.

Ericsson, "New option to Solution #8 Inter PLMN routing and TLS," S3-183565, 3GPP TSG SA WG3 (Security) Meeting #93, Nov. 12-16, 2018, Spokane (US), 4 pages.

Ericsson, "TLS between network function and the local SEPP," Change Request, S3-183566, 3GPP TSG SA WG3 (Security) Meeting #93, Nov. 12-16, 2018, Spokane (US), 2 pages.

* cited by examiner

FULLY QUALIFIED DOMAIN NAME HANDLING FOR SERVICE INTERACTIONS IN 5G

CROSS REFERENCE TO RELATED APPLICATIONS

This application is a 35 U.S.C. § 371 national stage application of PCT International Application No. PCT/EP2019/080046 filed on Nov. 4, 2019, which claims the benefit of U.S. Provisional Patent Application Ser. No. 62/755,800, filed on Nov. 5, 2018, the disclosures and content of which are incorporated by reference herein in their entireties.

TECHNICAL FIELD

The present disclosure relates generally to providing secure connections in communications systems and, more particularly, to operations of security edge protection proxies and of a network node for security edge protection of messages.

BACKGROUND

One major difference between the 5G System and the Evolved Packet System (4G) is the introduction of a Service-Based Architecture (SBA) in the Core Network (CN) instead of the legacy architecture based on point to point references for communication between the Core Network Functions (NFs). FIG. 1 illustrates a non-roaming reference architecture of a communications system according to the 3GPP TS 23.501 (V15.2.0). Service-based interfaces are used within the Control Plane (CP).

Though, there are few point-to-point reference points such N2 and N3 between the RAN and the CN, most of the NFs within the CN interact with each other using Service-Based interfaces (SBIs) over HTTP.

The SBA also applies for the roaming case, though a special NF, namely the Security Edge Protection Proxy (SEPP) has been introduced by the 3GPP security group SA3 in TS 33.501 to secure the communication over the roaming interface (N32 in FIG. 2) between the operators CNs. FIG. 2 illustrates a roaming reference architecture of a communications system according to TS 23.501. Two SEPP functions are illustrated in FIG. 2: the visited SEPP (cSEPP) in the visited PLMN; and the home SEPP (pSEPP) in the home PLMN.

TS 33.501 defines the SEPP as the entity interconnected at the perimeter of the PLMN network that operates to:
1. receive all service layer messages from the Network Function and protect them before sending them out of the network on the N32 interface; and
2. receive all messages on the N32 interface and forward them to the appropriate Network Function after verifying security, where present.

The SEPP implements application layer security for all the service layer information exchanged between two NFs across two different public land mobile networks (PLMNs).

To secure the communication over SBA, TS 33.501 mandates the support of the OAuth 2.0 framework for authorization and transport layer security (TLS) for authentication and secure intra PLMN communications between the NFs. For the protection of the communication over the N32 interface, TS 33.501 defines and mandates a new security protocol based on JOSE that is used between each pair of communicating SEPP peers.

Potential Problems with Existing Solutions

An atomic SBI interaction is realized via an exchange of HTTP Request/Response. A HTTP request carries the FQDN of the target which is a human readable globally unique identifier that is used to route the request to the target. When TLS 1.3. (HTTPS) is used, the SEPPs are required to terminate the TLS tunnels in order to perform the necessary processing and rewriting to secure the communication over the roaming interface. This gives rise to an issue that is documented in TR 33.855 as follows.

The FQDN in the Request URIs contain the FQDN of the remote PLMN. In order to terminate TLS, the SEPP needs to provide a certificate on behalf of a remote PLMN.

TLS 1.3 specified in RFC 8446 does not support static RSA and Diffie-Hellman cipher suites, which enable the server's private key to be shared with server-side middleboxes. As a consequence, it is no longer possible for a server to share a key with the middlebox and allow middlebox to access TLS session data.

The situation is illustrated in more detail in the service discovery and service request flows in FIG. 3 from TR 33.855. FIG. 3 illustrates service discovery and service request flows between elements of a communications system.

In FIG. 3, the curves 300 represent service discovery flow and the curve 310 represent service request flows. The TLS tunnels to, from, or between IPXs (network entities in the interconnect domain) may not be present.

The solution proposed initially by SA3 and captured in TS 33.501 named "telescopic FQDN" works as follow.

Assume an NF1 (e.g. AMF) in an operator A network (Visited PLMN) trying to discover and invoke services of another NF2 (e.g. UDM) in an operator B network (Home PLMN).

The NF2 internal address could be "nf2.operatorB.com". The SEPP in the operator B network could potentially send to the operator A (after topology hiding) "0x89ea67. operatorB.com".

The operator A SEPP's address is: "sepp.operatorA.com".

Following the solution, operator A SEPP will send to the NF in its network (operator A's network) the address: "0x89ea67.operatorB.com.sepp.operatorA.com". The NF1 will send an HTTPS request to the address: "0x89ea67. operatorB.com.sepp.operatorA.com". When TLS is used, it is then needed that the local SEPP (in operator A's network) is configured with wildcard cert of "*.sepp.operatorA.com".

The problem is that according to RFCs 2128 and 6165 the wildcard only covers one level of subdomains (the asterisk doesn't match full stops), the address "0x89ea67. operatorB. com.sepp.operatorA.com" would not be valid for the operator A SEPP certificate.

It has been suggested that the SEPP in this case could rewrite the additional prefix, in the example: "0x89ea67. operatorB.com" into a full-stop-free string by replacing the full stop with another character used as a separator. This is restrictive and may result in ambiguities unless the encoding with this new separator is standardized. It would be also against security best practices to suggest violating recommended ways of certificate validation with a new encoding scheme just to force things to work.

Further Overview of Example 5G System Architecture

Compared to previous generations the 3GPP 5G system architecture is service based. That means wherever suitable the architecture elements are defined as network functions that offer their services via interfaces of a common framework to any network functions that are permitted to make use of these provided services. Network repository functions (NRF) allow every network function to discover the services offered by other network functions. This architecture model, which further adopts principles like modularity, reusability and self-containment of network functions, is chosen to enable deployments to take advantage of the latest virtualization and software technologies. The related service based architecture figures depict those service based principles by showing the network functions, primarily Core Network functions, with a single interconnect to the rest of the system. Reference point based architecture figures are also provided by the stage 2 specifications, which represent more specifically the interactions between network functions for providing system level functionality and to show inter-PLMN interconnection across various network functions.

FIG. 2 shows one of the service based architecture figures, which is for a roaming scenario with local breakout, i.e. the roaming UE interfaces the Data Network (DN) in the visited network (VPLMN) and the home network (HPLMN) enables it with subscription information (UDM), subscriber authentication (AUSF) and UE specific policies (PCF). Network slice selection (NSSF), network access control and mobility management (AMF), data service management (SMF) and application functions (AF) are provided by the VPLMN. The user plane (UPF) is managed following a model of control and user plane separation similar to what was already introduced in the latest 3GPP 4G release. Security proxies (SEPP) protect the interactions between PLMNs.

In the local breakout scenarios a UE receives the services of a PLMN typically completely from the serving operator's administrative domain. Home-routed data services are the alternative for roaming scenarios, which have also network functions from the home operator's administrative domain involved and the UE interfaces the DN in the HPLMN.

Service based principles apply between the control plane network functions of the Core Network. Further, the 5G system architecture allows network functions to store their contexts in Data Storage Functions (DSF). Functionality for releasing the UE specific Access Network—Core Network transport associations from one AMF and re-binding with another AMF enables separating such data storage also for the AMF. Earlier system architectures had more persistent UE specific transport associations, which made it more complex to change the UE's serving node that compares to an AMF. The new functionality simplifies changing the AMF instance that serves a UE. It also supports increasing AMF resilience and load balancing as every AMF from a set of AMFs deployed for the same network slice can handle procedures of any UE served by the set of AMFs.

The internetwork interconnect allows secure communication between service-consuming and service-producing NFs in different PLMNs. Security is enabled by the Security Edge Protection Proxies of both networks, henceforth called cSEPP and pSEPP, depending on where service consumer and service producer are located. The SEPPs enforce protection policies regarding application layer security, thereby ensuring integrity and confidentiality protection for the elements to be protected.

SUMMARY

Some embodiments of the present disclosure are directed to a method by a first security edge protection proxy (SEPP) for security edge protection of messages being communicated between first and second communications networks of a communications system. The method includes receiving, from a first network function of the first communications network, a first message containing an address identifying a second network function which is located in the second communications network. The method further includes receiving, from a second SEPP operating to protect communications with the second communications network, a second message containing a fully qualified domain name (FQDN) reference for a combination of the second SEPP and the second network function. The method stores the FQDN reference for the combination of the second SEPP and second network function in a label-to-FQDN mapping data structure with a logical association to a substitute locally-unique label. The method sends a third message containing the substitute locally-unique label to the first network function.

Some other embodiments of the present disclosure are directed to a first security edge protection proxy network node for security edge protection of messages being communicated between first and second communications networks of a communications system. In some of the embodiments explained in further detail below, the network node is configured to receive, from a first network function of the first communications network, a first message containing an address identifying a second network function which is located in the second communications network. The network node also receives, from a second SEPP operating to protect communications with the second communications network, a second message containing a FQDN reference for a combination of the second SEPP and the second network function. The network node stores the FQDN reference for the combination of the second SEPP and second network function in a label-to-FQDN mapping data structure with a logical association to a substitute locally-unique label, and sends a third message containing the substitute locally-unique label to the first network function.

Some other embodiments of the present disclosure are directed to a method for security edge protection of messages being communicated between first and second communications networks of a communications system. The method includes receiving, from a first network function of the first communications network, a first message containing an address identifying a second network function which is located in the second communications network. The method further includes receiving, from a second SEPP operating to protect communications with the second communications network, a second message containing a fully qualified domain name (FQDN) reference for a combination of the second SEPP and the second network function. The method stores the FQDN reference for the combination of the second SEPP and second network function in a label-to-FQDN mapping data structure with a logical association to a substitute locally-unique label. The method sends a third message containing the substitute locally-unique label to the first network function.

Some other embodiments of the present disclosure are directed to at least one network node for security edge protection of messages being communicated between first and second communications networks of a communications system. The at least one network node is configured to receive, from a first network function of the first communications network, a first message containing an address identifying a second network function which is located in the second communications network. The at least one network node also receives, from a second SEPP operating to protect communications with the second communications network, a second message containing a FQDN reference for a combination of the second SEPP and the second network function. The at least one network node stores the FQDN reference for the combination of the second SEPP and second network function in a label-to-FQDN mapping data structure with a logical association to a substitute locally-unique label, and sends a third message containing the substitute locally-unique label to the first network function.

Potential advantages of various embodiments of the present disclosure include that they may overcome the problem with legitimate TLS termination in middlebox (SEPP) by mapping the original FQDN with locally unique new FQDN by maintaining a label-to-FQDN mapping data structure, which can be a simple translation table, in a network node, e.g., SEPP, and avoiding the use of multilevel wildcard certificates.

Other methods and network nodes according to embodiments of the inventive subject matter will be or become apparent to one with skill in the art upon review of the following drawings and detailed description. It is intended that all such additional methods and network nodes be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
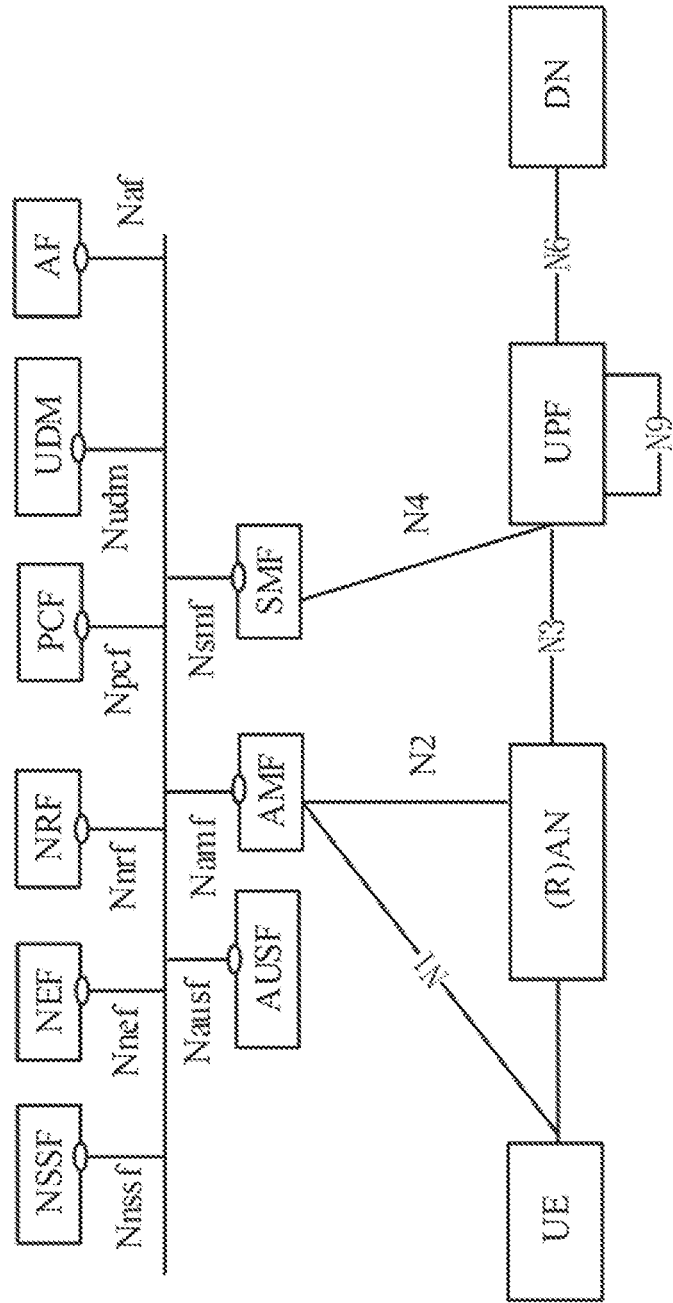
FIG. 1 illustrates a non-roaming reference architecture of a communications system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

Introduction to Embodiments of the Present Disclosure

According to various embodiments of the present disclosure, instead of appending the consumer SEPP (cSEPP) FQDN to the received producer network function (pNF) FQDN sent by the producer SEPP (pSEPP), the cSEPP replaces the received pNF FQDN in the reply message receiver from pSEPP with new FQDN formed with a locally unique label (a label that is locally unique at the SEPP) as the first element and the cSEPP's own FQDN as suffix. The "label" can be any label the Operator A SEPP can translate back to original pNF FQDN received from pSEPP.

Potential Advantages of the Present Disclosure

Various embodiments of the present disclosure may overcome the problem with legitimate TLS termination in middlebox (SEPP) by mapping the original FQDN with locally unique new FQDN by maintaining a simple translation table in SEPP and avoiding the use of multilevel wildcard certificates.

Operations According to Various Embodiments of the Present Disclosure

In some embodiments, the SEPP rewrites the FQDN into a pattern that matches the certificate rules and that the SEPP keeps a record of the rewritten FQDNs.

So when a SEPP receives a request containing an FQDN of a foreign network "pNF.foreign_network.com", assuming that the SEPP has an internal FQDN of the form "SEPP.own_network.com", then the SEPP generates a unique label (say "label") and associates it with the FQDN of the foreign network for example in an internal mapping structure or a look up table appends this label to its own FQDN and uses the result, i.e. "label. SEPP.own_network.com" towards the NFs in its own network. The NFs would reply using the same FQDN and hence the SEPP would be able to recover the original foreign network FQDN from the internal map or look-up table and use that instead in the outgoing reply.

Figure 2:
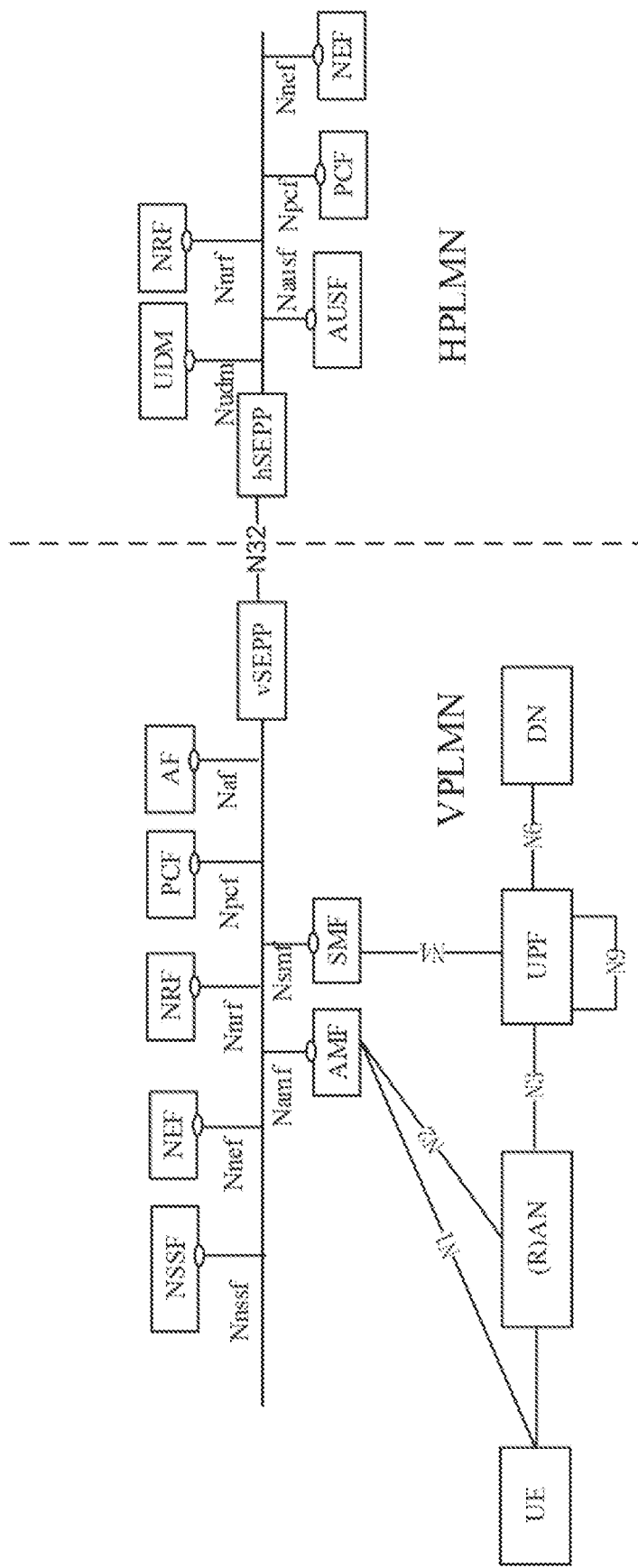
FIG. 2 illustrates a roaming reference architecture of a communications system.
Figure 3:
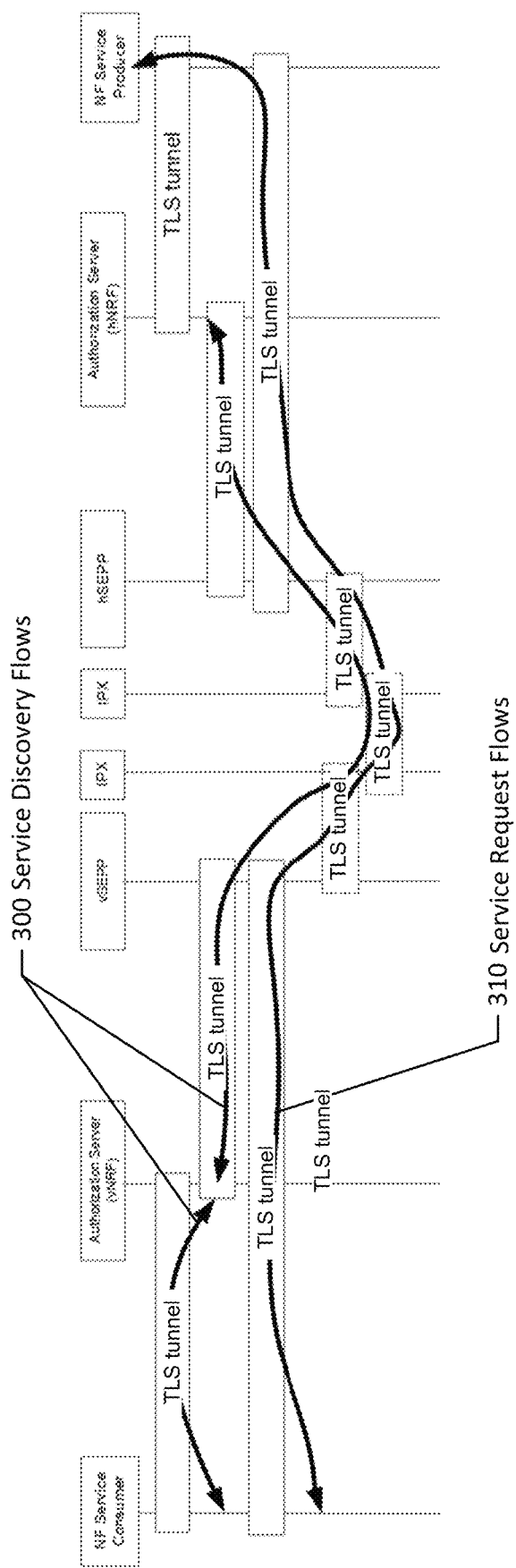
FIG. 3 illustrates service discovery and service request flows between elements of a communications system.

Operations that elements of a communications system, e.g., the systems of FIGS. 1, 2, and/or 3, may perform as part of a NF service discovery procedure can include any one or more of the following:

1. The consumer NF in the serving PLMN requests the service discovery from its own NRF for a producer NF in the home PLMN.
2. The NRF sends a discovery request to the home NRF. Inter-PLMN message exchange between NRFs happens through cSEPP and pSEPP via N32.
3. The home NRF returns the producer NF's FQDN, e.g. "pNF.foreign_network.tld", and sends the response back to the requesting NRF via the pSEPP.
4. Depending on operator policy, the pSEPP may rewrite the producer NF's FQDN inside the discovery response if necessary, for topology hiding, e.g. "rewritten pNF.foreign_network.tld".
5. The pSEPP transfers the discovery response via N32 to the cSEPP.
6. The cSEPP, of which the internal interface has FQDN "cSEPP.own_network.tld", rewrites the producer NF's FQDN to a new unique FQDN consisting of a unique label as first element of FQDN and the cSEPP FQDN as suffix: ""label.cSEPP.own_network.tld"". The ""label"" can be any unique label that the cSEPP can translate back to original producer NF's FQDN received from pSEPP.'
7. The cSEPP sends the discovery response including the new FQDN to its own NRF, which will in turn forward this information to the consumer NF.
8. The consumer NF resolves the received FQDN to the IP address of the cSEPP.
9. The consumer NF sets up a TLS connection to the IP of cSEPP. The hostname shall be equal to the FQDN received from local NRF.
10. The cSEPP authenticates towards the consumer NF using a wildcard certificate for "*.cSEPP.own_network.tld"
11. The cSEPP rewrites the hostname in the HTTP request, e.g. to "rewritten_pNF.foreign_network.tld"
12. The pSEPP rewrites the hostname in the HTTP request, e.g. to "pNF.foreign_network.tld" and transfers the message to the corresponding producer NF.

Operations that may be performed by a SEPP to generate the unique label may include any one or more of the following:

1. generate the unique label based on a randomly generated string that is locally unique;
2. generate the unique label based on a based on a combination of a foreign public land mobile network (PLMN) mobile network code (MNC) and mobile country code (MCC) combined with a counter; and
3. generate the unique label based on a hash of the original FQDN.

The label can be generated to conform to RFCs 952 and RFC 1123 requirements for a domain label.

The association between FQDN could be performed by a key/value pair structure implemented either in lookup table or other in memory structure specific to runtime environment or by using external key/value storage.

Although various embodiments been described in the context of various non-limiting examples above, the associated operations and methods are not limited thereto. More general operations and methods thereof will now be discussed in the context of the flowcharts of FIGS. 4 and 5 which may be performed by a SEPP for security edge protection of messages being communicated between first and second communications networks of a communications system in accordance with some embodiments of the present disclosure.

Figure 4:
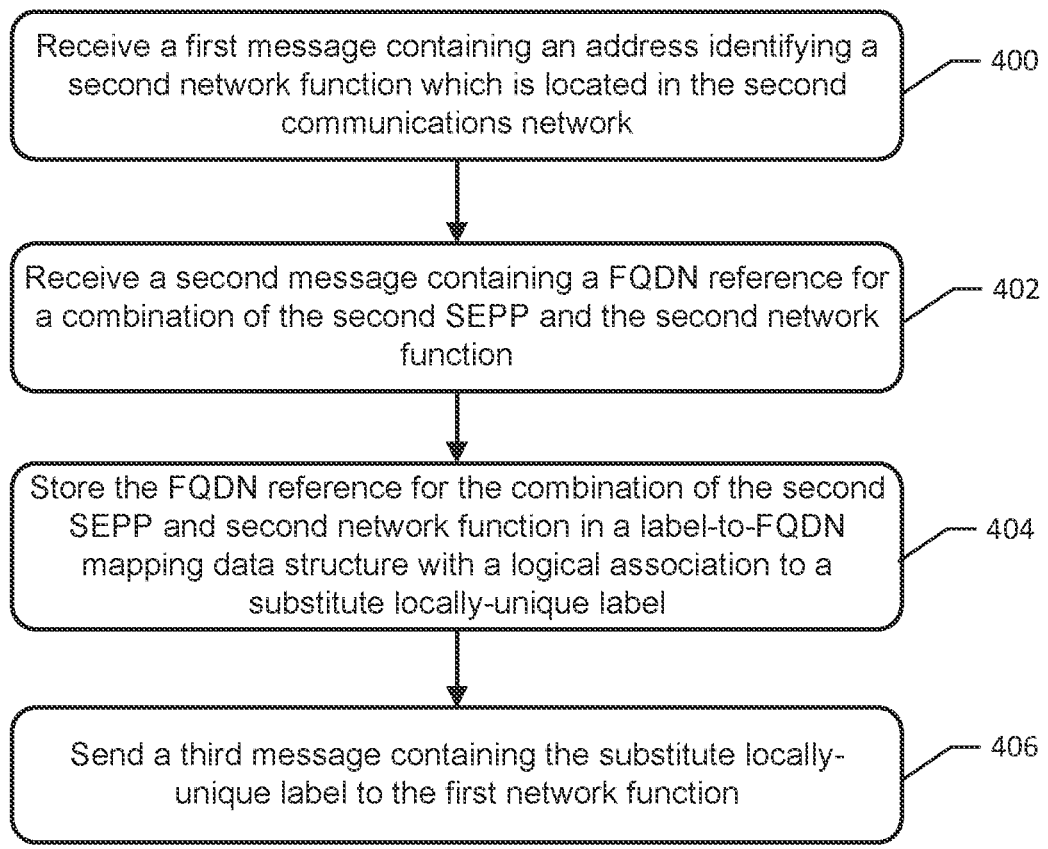
FIGS. 4 and 5 are flowcharts of operations that may be performed by a security edge protection proxy (SEPP) for security edge protection of messages being communicated between first and second communications networks of a communications system in accordance with some embodiments of the present disclosure.

Referring to FIG. 4, operations and methods are shown by a first SEPP for security edge protection of messages being communicated between first and second communications networks of a communications system. The operations and methods include receiving 400, from a first network function of the first communications network, a first message containing an address identifying a second network function which is located in the second communications network. The operations and methods receive 402, from a second SEPP operating to protect communications with the second communications network, a second message containing a FQDN reference for a combination of the second SEPP and the second network function. The operations and methods store 404 the FQDN reference for the combination of the second SEPP and second network function in a label-to-FQDN mapping data structure with a logical association to a substitute locally-unique label. The operations and methods send 406 a third message containing the substitute locally-unique label to the first network function.

The operations and methods may further include selecting the substitute locally-unique label to be stored with a logical association to the FQDN reference for the combination of the second SEPP and the second network function, based on a certificate rule.

The operations and methods may generate the substitute locally-unique label to be stored with a logical association to the FQDN reference for the combination of the second SEPP and the second network function, based on a randomly generated locally unique string.

Alternatively or additionally, the operations and methods may generate the substitute locally-unique label to be stored with a logical association to the FQDN reference for the combination of the second SEPP and the second network function, based on a combination of a foreign public land mobile network, PLMN, mobile network code, MNC, and mobile country code, MCC, combined with a counter.

Still alternatively or additionally, the operations and methods may generate the substitute locally-unique label to be stored with a logical association to the FQDN reference for the combination of the second SEPP and the second network function, based on a hash of the FQDN reference for the combination of the second SEPP and second network function.

The step of sending 406 the third message containing the substitute locally-unique label to the first network function, may include appending the substitute locally-unique label to a FQDN of the first SEPP. The substitute locally-unique label may be appended as a first element of the FQDN of the first SEPP.

Figure 5:
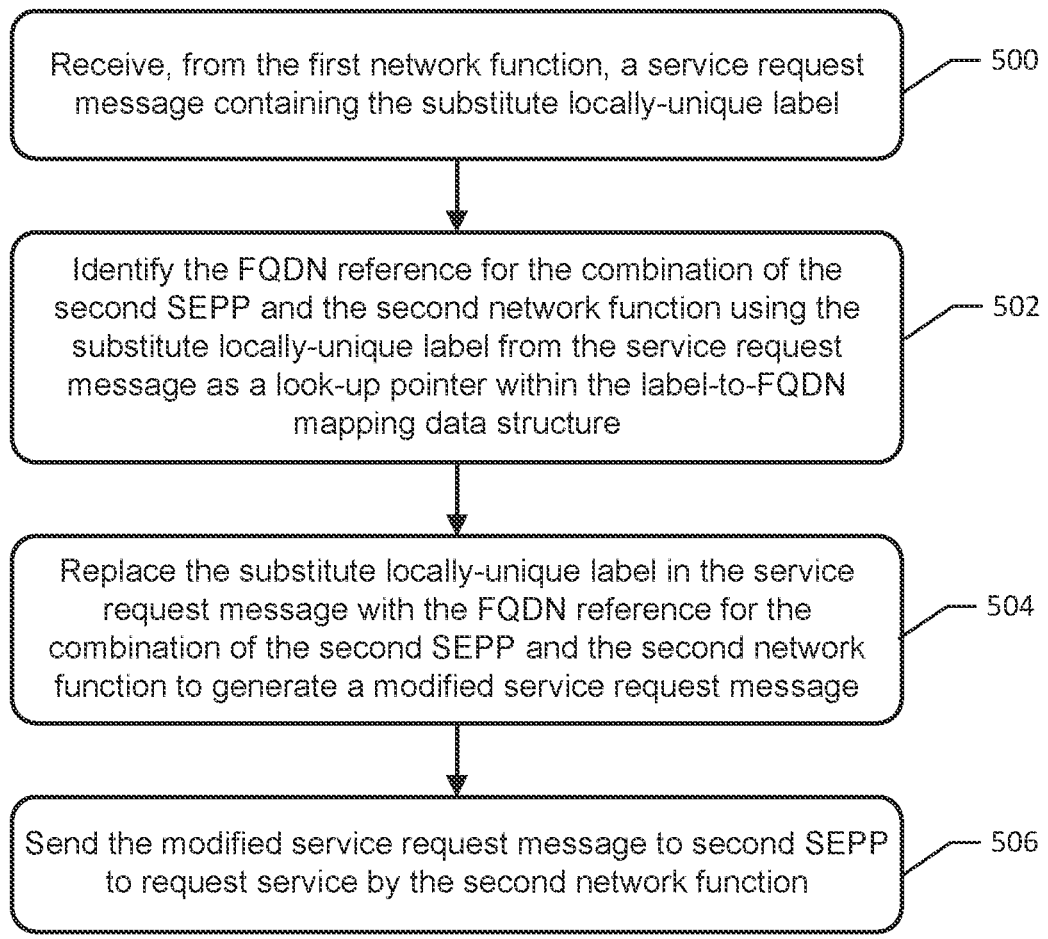

Referring now to FIG. 5, the first message may be a service discovery message or service request message). The second message may be a service reply message or service request response message. The operations and methods may further include receiving 500, from the first network function, a service request message containing the substitute locally-unique label. The FQDN reference for the combination of the second SEPP and the second network function is identified 502 using the substitute locally-unique label from the service request message as a look-up pointer within the label-to-FQDN mapping data structure. The substitute locally-unique label in the service request message is replaced 504 with the FQDN reference for the combination of the second SEPP and the second network function to generate a modified service request message. The modified service request message is then sent 506 to second SEPP to request service by the second network function.

Referring again to FIG. 4, the first message may be a service discovery request message (or service request message), and the second message may be a service discovery reply message (or service request response message). The first message may be received from a first network repository function (NRF) of the first communications system as a service discovery request for the first network function. The operations and methods may further include sending the service discovery request through the second SEPP to a second NRF of the second communications system. The second message may be received from the second SEPP as the reply message for the NRF for the second network function.

The first communications network may be a visited public land mobile network, and the second communications network may be a home public land mobile network.

The first network function may be, for example, a network access control and mobility management function (AMF). The second network function may be, for example, a unified data management (UDM) function. Operations and methods may include setting up a transport layer security (TLS) connection between the first SEPP and the first network function. Operations and methods may include authenticating the TLS connection toward the first network function using a wildcard certificate for the substitute locally-unique label.

Figure 6:
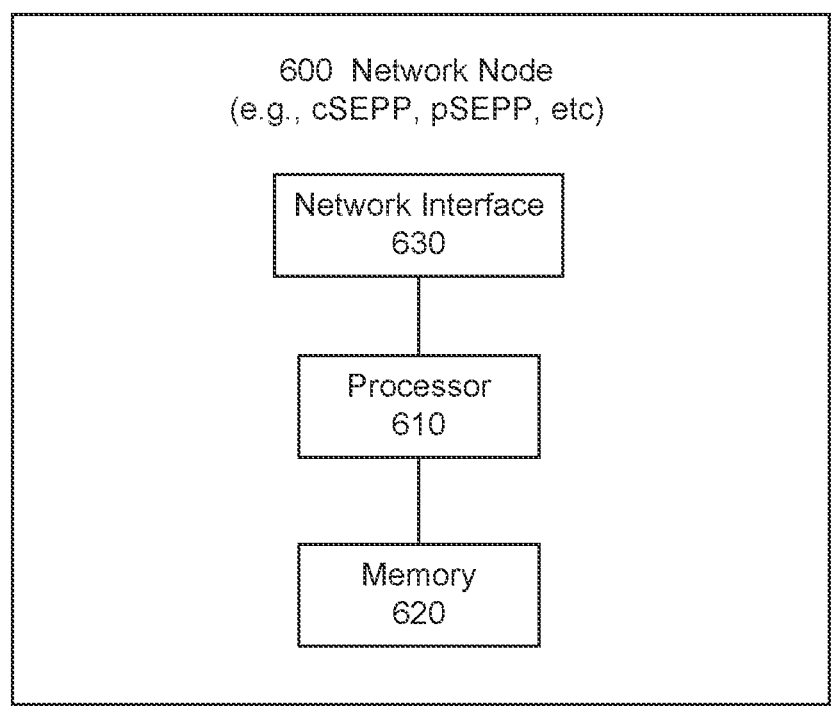
FIG. 6 is a block diagram of a network node which may provide a SEPP function and have elements configured to operate in accordance with some embodiments of the present disclosure.
Figure 7:
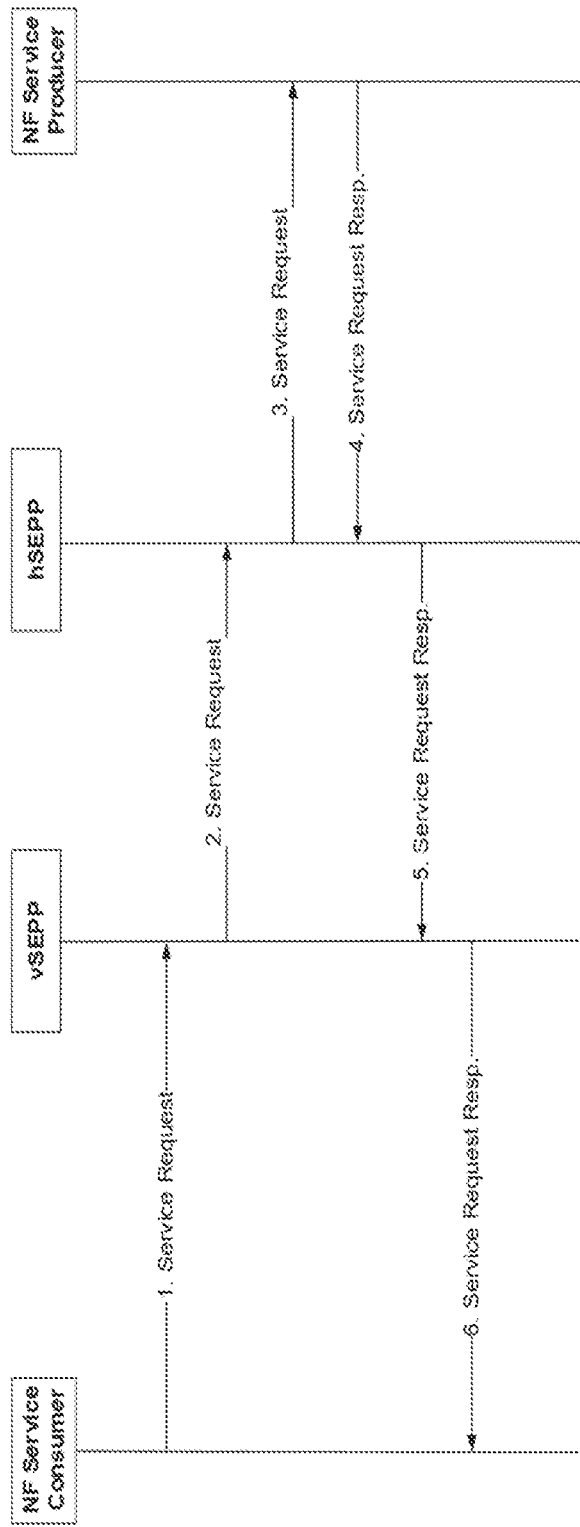
FIG. 7 shows example operations for message routing in roaming scenarios in accordance with some embodiments of the present disclosure.

Example Network Node:

FIG. 6 is a block diagram illustrating a network node 600, such as a SEPP network node for security edge protection of messages being communicated between first and second communications networks of a communications system which is configured to operate according to some embodiments. The network node 600 includes a processor circuit 610 (also referred to as a processor), a memory circuit 620 (also referred to as memory), and a network interface 630 (e.g., wired network interface and/or wireless network interface) configured to communicate with other network nodes. The memory 620 stores computer readable program code that when executed by the processor 610 causes the processor 610 to perform operations according to embodiments disclosed herein, such as for a cSEPP, pSEPP, or other elemental nodes of a communications system.

LISTING OF EMBODIMENTS

1. A method by a first security edge protection proxy, SEPP, for security edge protection of messages being communicated between first and second communications networks of a communications system, the method comprising:
  receiving (400), from a first network function of the first communications network, a first message containing an address identifying a second network function which is located in the second communications network;
  receiving (402), from a second SEPP operating to protect communications with the second communications network, a second message containing a fully qualified domain name, FQDN, reference for a combination of the second SEPP and the second network function;
  storing (404) the FQDN reference for the combination of the second SEPP and second network function in a label-to-FQDN mapping data structure with a logical association to a substitute locally-unique label; and
  sending (406) a third message containing the substitute locally-unique label to the first network function.

2. The method of Embodiment 1, further comprising:
  selecting the substitute locally-unique label to be stored with a logical association to the FQDN reference for the combination of the second SEPP and the second network function, based on a certificate rule.

3. The method of any of Embodiments 1 to 2, further comprising:
  generating the substitute locally-unique label to be stored with a logical association to the FQDN reference for the combination of the second SEPP and the second network function, based on a randomly generated locally unique string.

4. The method of any of Embodiments 1 to 3, further comprising:
  generating the substitute locally-unique label to be stored with a logical association to the FQDN reference for the combination of the second SEPP and the second network function, based on a combination of a foreign public land mobile network, PLMN, mobile network code, MNC, and mobile country code, MCC, combined with a counter.

5. The method of any of Embodiments 1 to 4, further comprising:
  generating the substitute locally-unique label to be stored with a logical association to the FQDN reference for the combination of the second SEPP and the second network function, based on a hash of the FQDN reference for the combination of the second SEPP and second network function.

6. The method of any of Embodiments 1 to 5, wherein the step of sending (406) the third message containing the substitute locally-unique label to the first network function, comprises:
  appending the substitute locally-unique label to a FQDN of the first SEPP.

7. The method of Embodiment 6, wherein:
the substitute locally-unique label is appended as a first element of the FQDN of the first SEPP 8. The method of any of Embodiments 1 to 7,
wherein the first message comprises a service discovery message;
wherein the second message comprises a service reply message; and
further comprising:
  receiving (500), from the first network function, a service request message containing the substitute locally-unique label;
  identifying (502) the FQDN reference for the combination of the second SEPP and the second network function using the substitute locally-unique label from the service request message as a look-up pointer within the label-to-FQDN mapping data structure;
  replacing (504) the substitute locally-unique label in the service request message with the FQDN reference for the combination of the second SEPP and the second network function to generate a modified service request message; and
  sending (506) the modified service request message to second SEPP to request service by the second network function.

9. The method of any of Embodiments 1 to 8, wherein:
the first message is a service discovery request message; and
the second message is a service discovery reply message.

10. The method of Embodiment 9,
wherein the first message is received from a first network repository function, NRF, of the first communications system as a service discovery request for the first network function;
further comprising sending the service discovery request through the second SEPP to a second NRF of the second communications system; and
wherein the second message is received from the second SEPP as the reply message for the NRF for the second network function.

11. The method of any of Embodiments 1 to 10, wherein:
the first communications network is a visited public land mobile network; and
the second communications network is a home public land mobile network.

12. The method of any of Embodiments 1 to 11, wherein:
the first network function is a network access control and mobility management function, AMF.

13. The method of any of Embodiments 1 to 12, wherein:
the second network function is a unified data management, UDM, function.

14. The method of any of Embodiments 1 to 13, further comprising:
setting up a transport layer security, TLS, connection between the first SEPP and the first network function.

15. The method of Embodiment 14, further comprising:
authenticating the TLS connection toward the first network function using a wildcard certificate for the substitute locally-unique label.

16. A network node adapted to perform according to any of Embodiments 1 to 15.

17. A first security edge protection proxy, SEPP, network node (600) for security edge protection of messages being communicated between first and second communications networks of a communications system, the network node configured to:
  receive, from a first network function of the first communications network, a first message containing an address identifying a second network function which is located in the second communications network;
  receive, from a second SEPP operating to protect communications with the second communications network, a second message containing a fully qualified domain name, FQDN, reference for a combination of the second SEPP and the second network function;
  store the FQDN reference for the combination of the second SEPP and second network function in a label-to-FQDN mapping data structure with a logical association to a substitute locally-unique label; and
  send a third message containing the substitute locally-unique label to the first network function.

18. A first security edge protection proxy, SEPP, network node (600) for security edge protection of messages being communicated between first and second communications networks of a communications system, the network node comprising:
  a processor (610); and
  a memory (620) coupled to the processor, wherein the memory stores instructions that when executed by the processor causes the processor to perform operations according to any of Embodiments 1 to 15.

19. A computer program product, comprising:
a non-transitory computer readable storage medium (620) comprising computer readable program code embodied in the medium that when executed by a processor of a network node causes the processor to perform operations according to any of Embodiments 1 to 15.

Further Definitions and Embodiments are Discussed Below

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
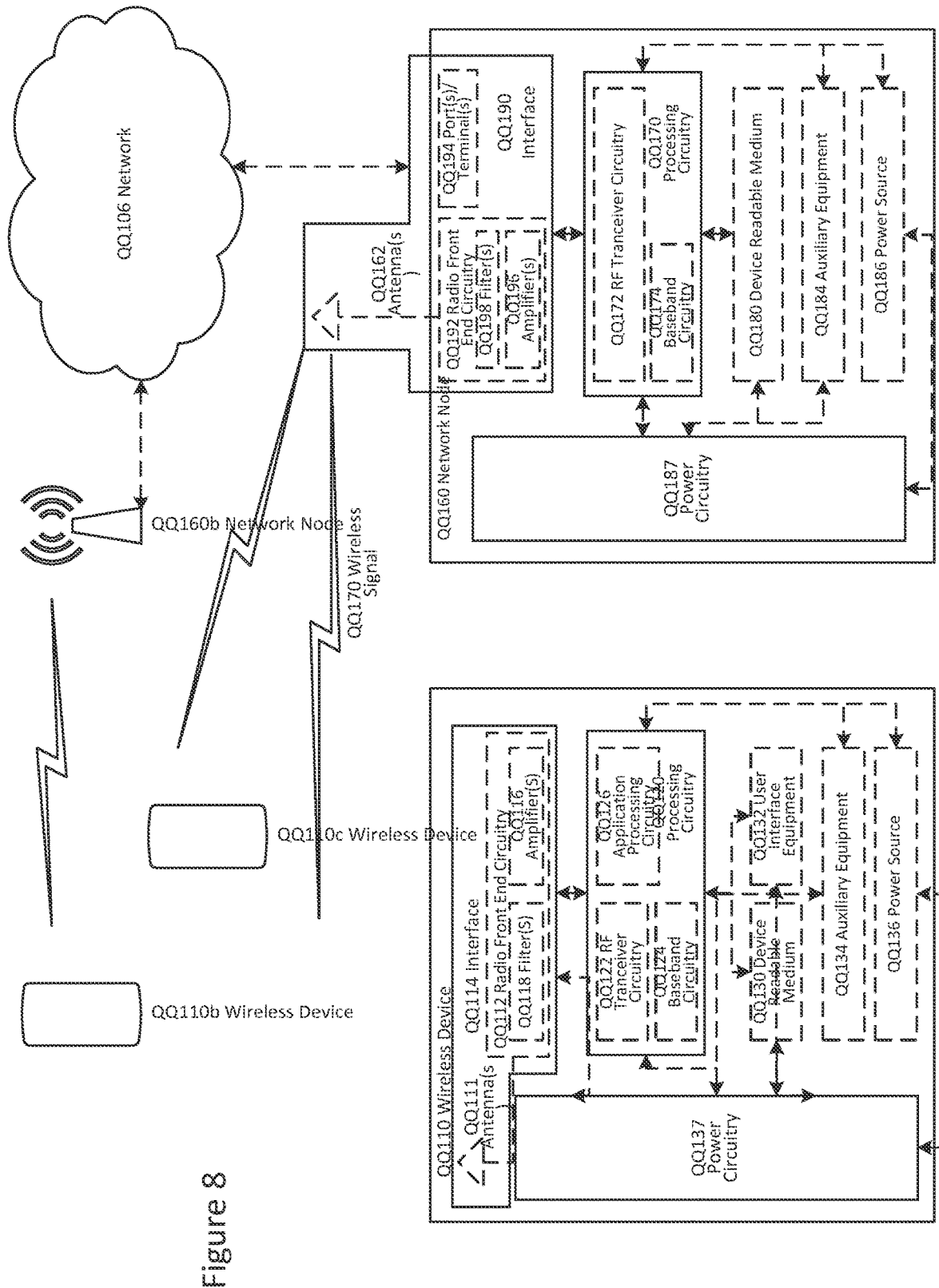
FIG. 8 is a block diagram of a wireless network in accordance with some embodiments of the present disclosure.

FIG. 8: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE or other terminal implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
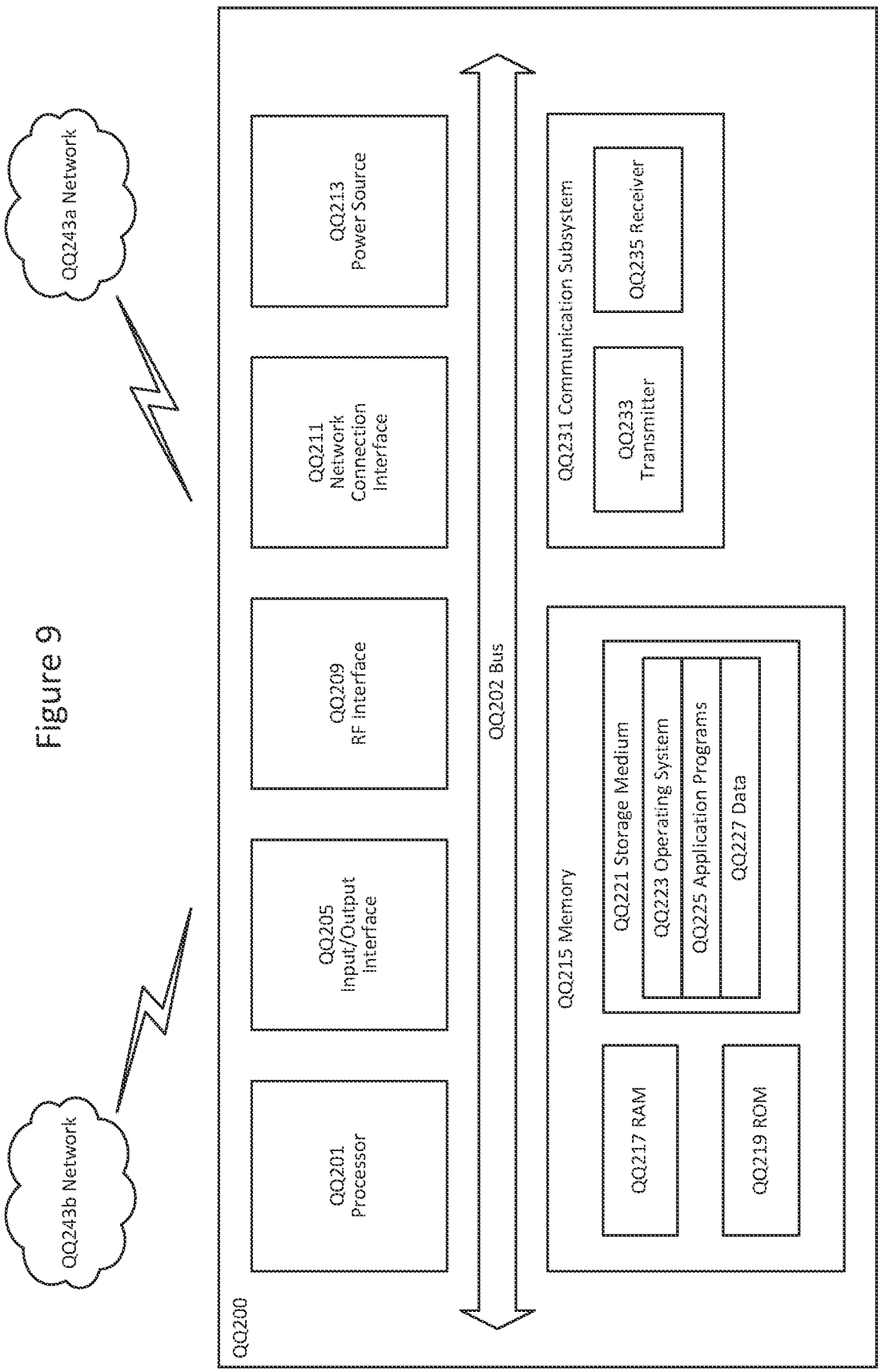
FIG. 9 is a block diagram of a user equipment or other terminal in accordance with some embodiments of the present disclosure.

FIG. 9: User Equipment in accordance with some embodiments

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
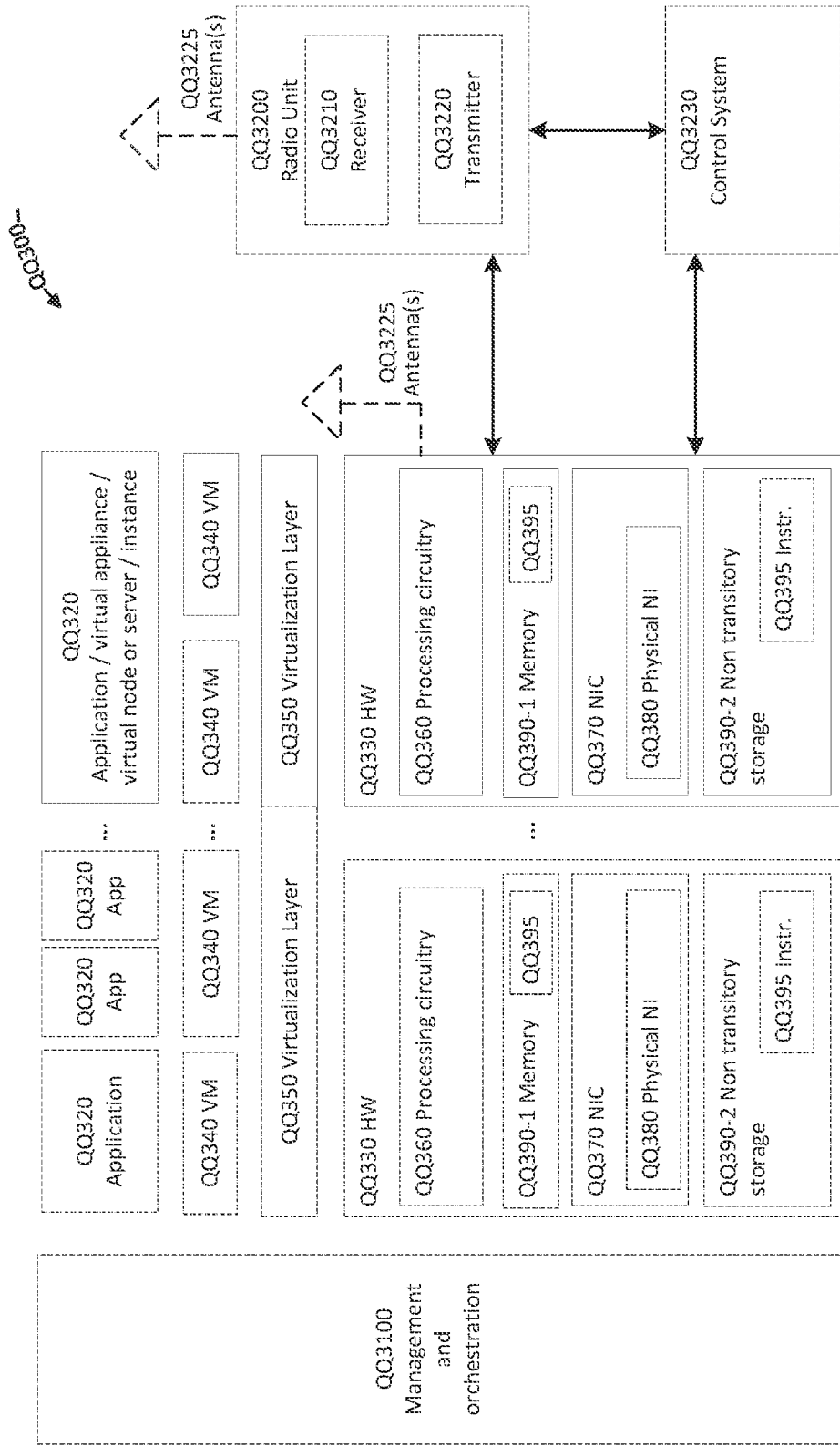
FIG. 10 is a block diagram of a virtualization environment in accordance with some embodiments of the present disclosure.

FIG. 10: Virtualization environment in accordance with some embodiments

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 11:
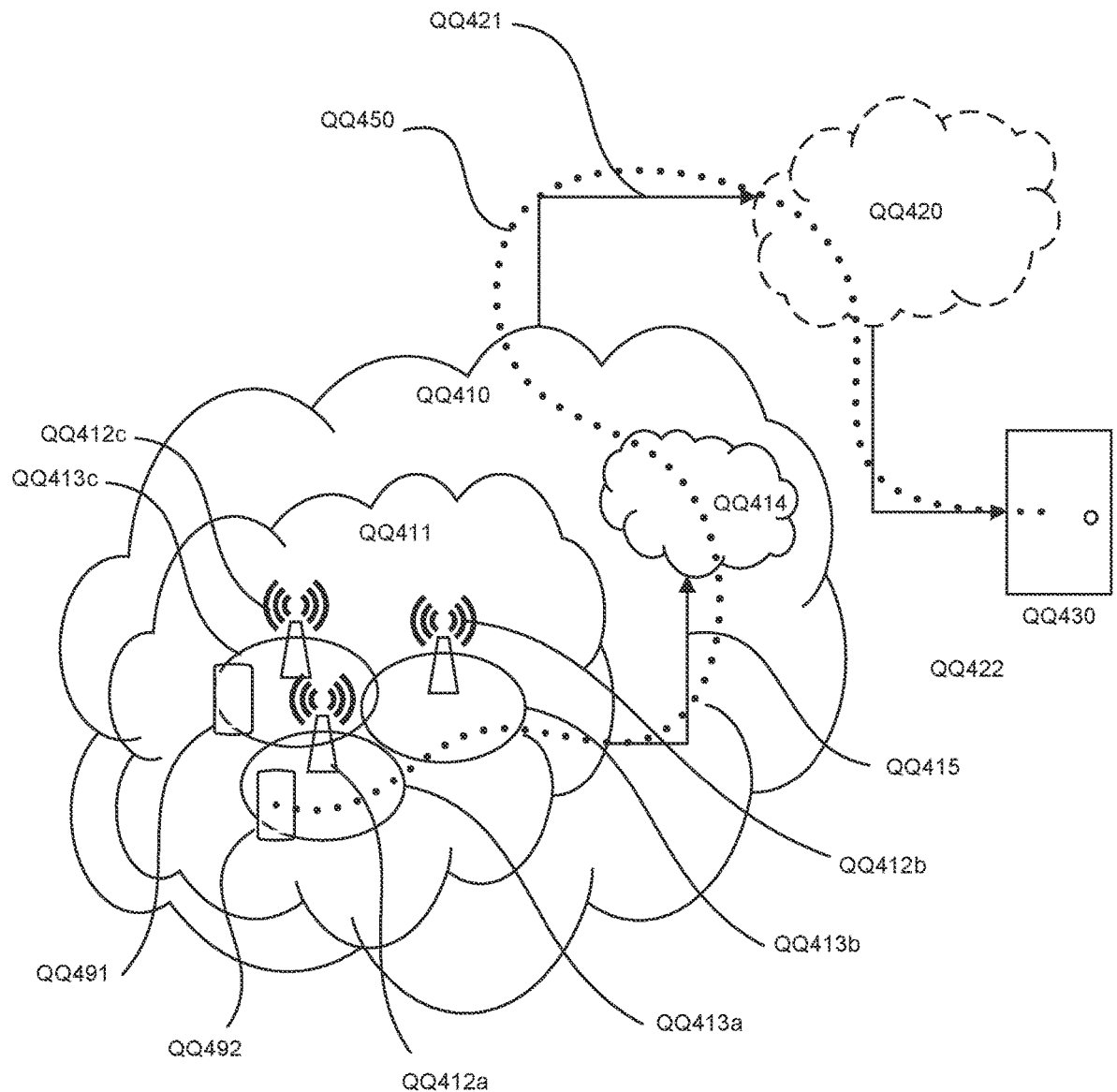
FIG. 11 is a block diagram of a telecommunication network connected via an intermediate network to a host computer in accordance with some embodiments of the present disclosure.

FIG. 11: Telecommunication network connected via an intermediate network to a host computer in accordance with some embodiments.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 12:
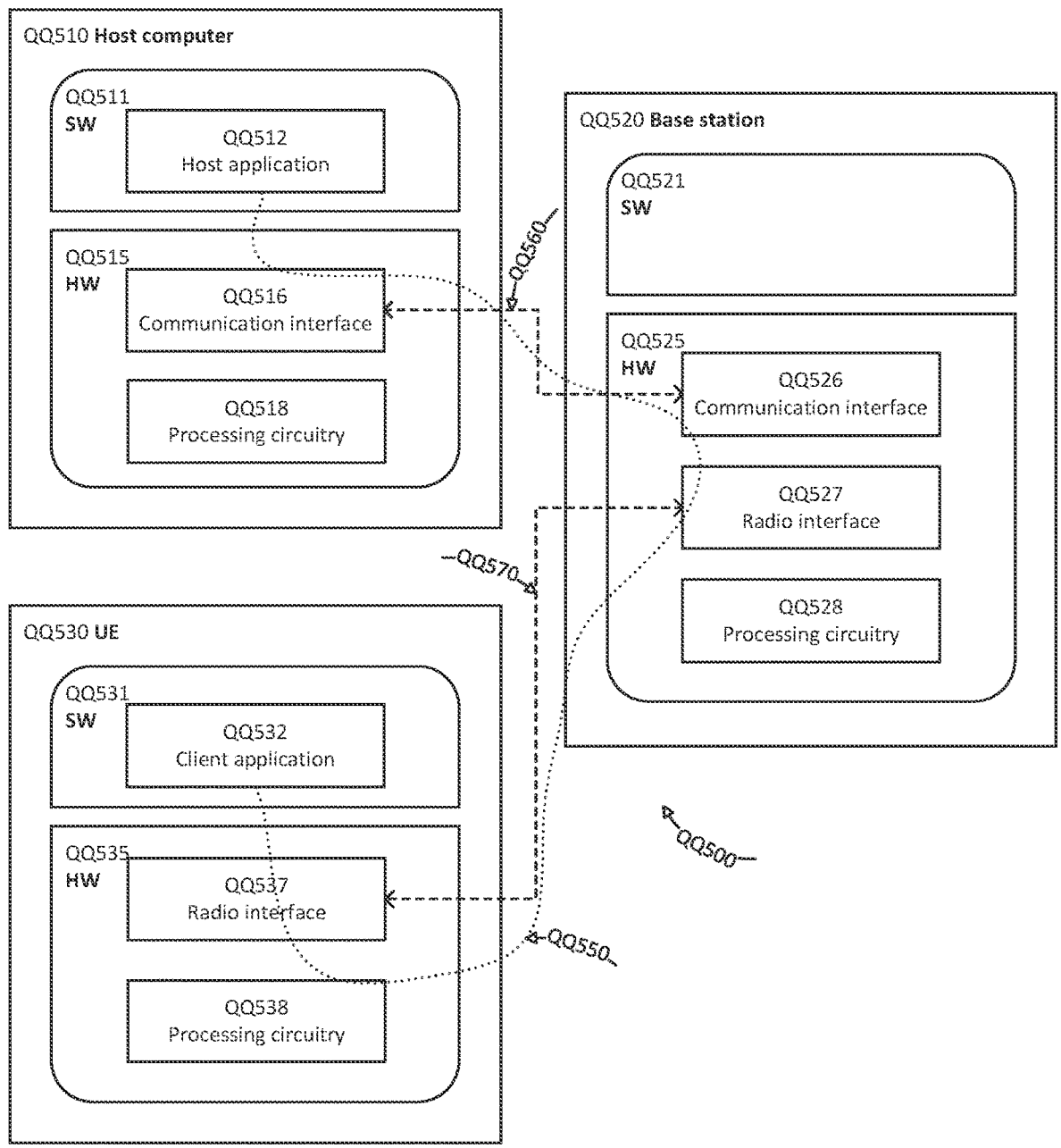
FIG. 12 is a block diagram of a host computer communicating via a base station with a user equipment user equipment or other terminal over a partially wireless connection in accordance with some embodiments of the present disclosure.

FIG. 12: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in Figure QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
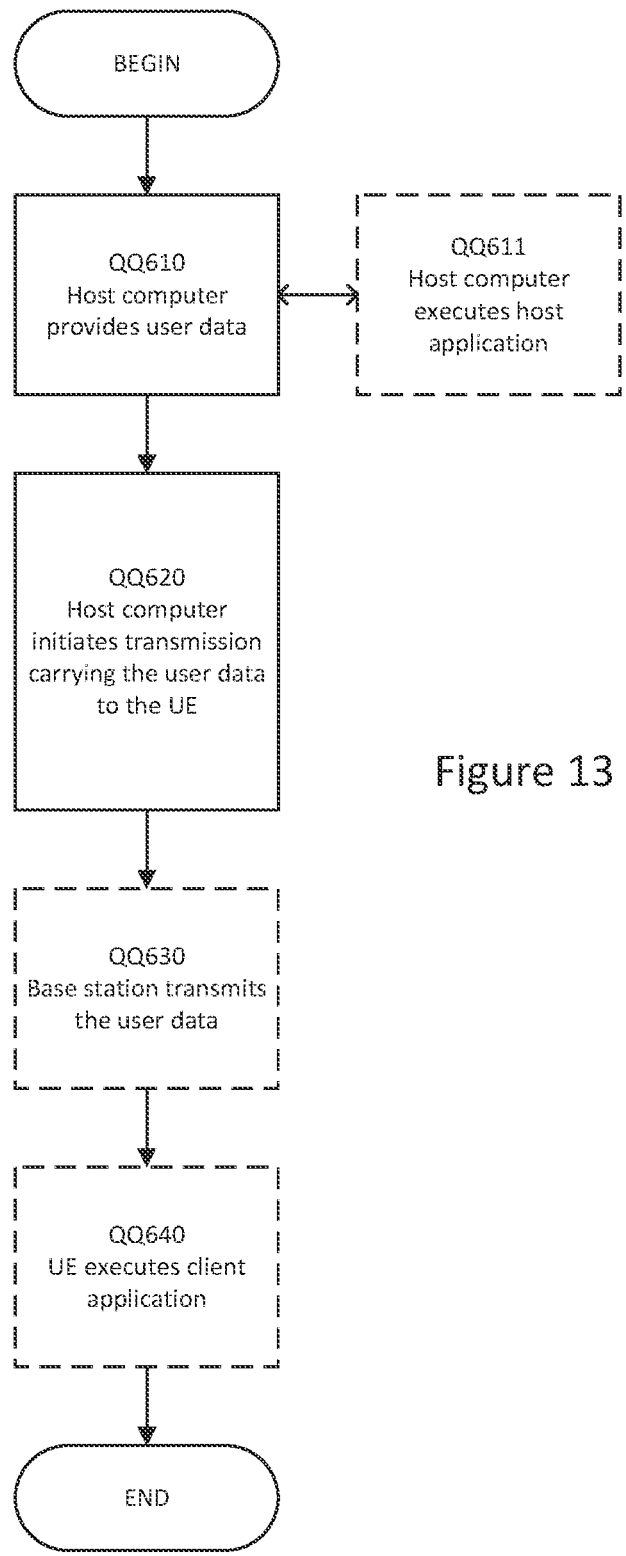
FIG. 13 is a block diagram of methods implemented in a communication system including a host computer, a base station and a user equipment user equipment or other terminal in accordance with some embodiments of the present disclosure.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
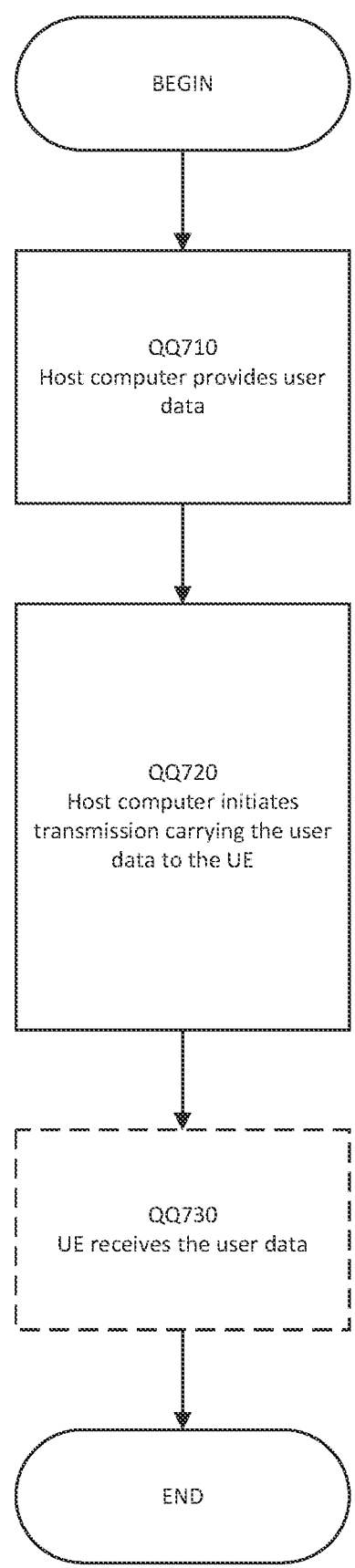
FIG. 14 is a block diagram of methods implemented in a communication system including a host computer, a base station and a user equipment user equipment or other terminal in accordance with some embodiments of the present disclosure.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
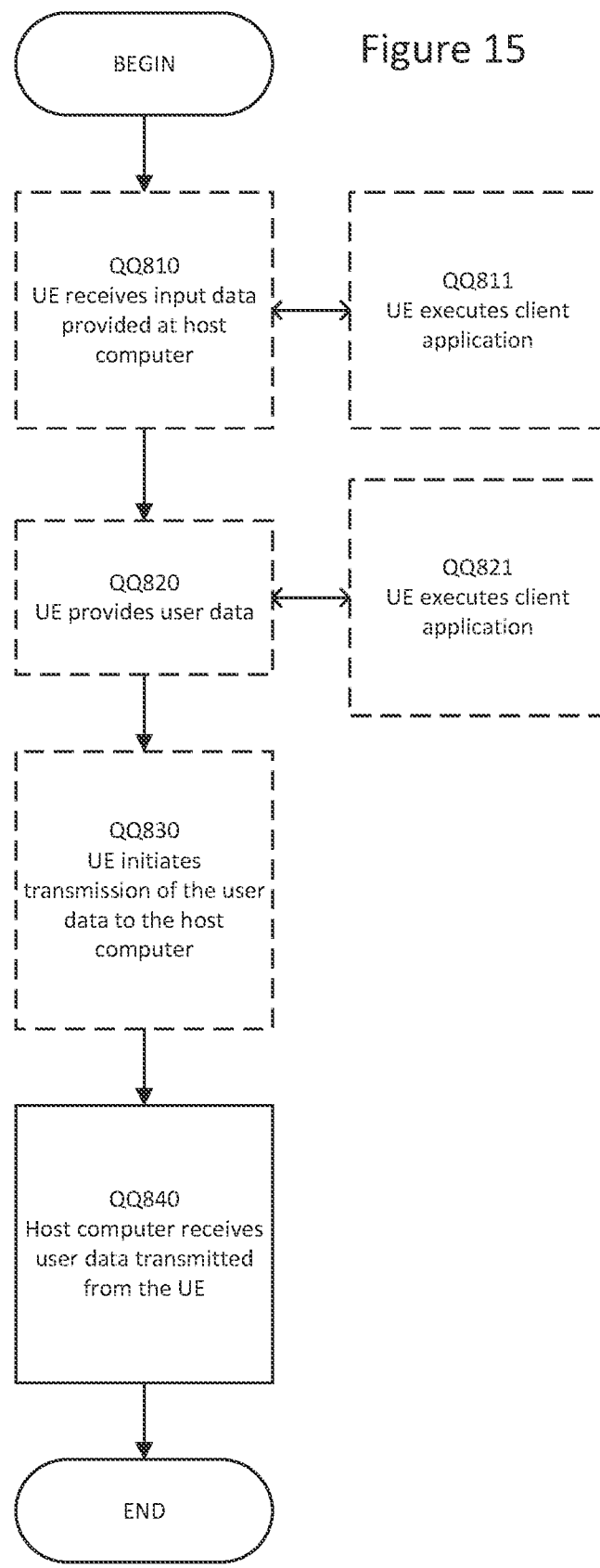
FIG. 15 is a block diagram of methods implemented in a communication system including a host computer, a base station and a user equipment user equipment or other terminal in accordance with some embodiments of the present disclosure.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
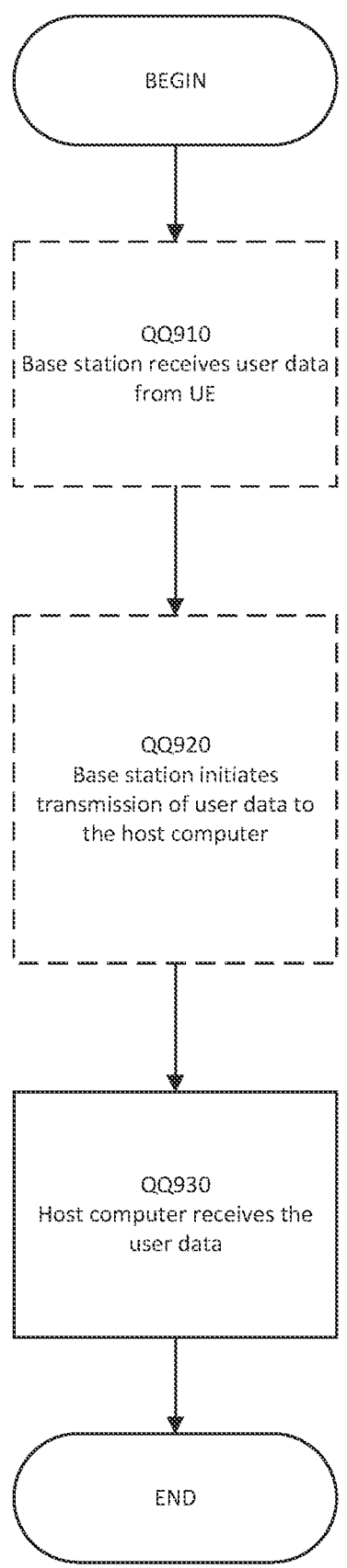
FIG. 16 is a block diagram of methods implemented in a communication system including a host computer, a base station and a user equipment user equipment or other terminal in accordance with some embodiments of the present disclosure.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations cSEPP Consumer SEPP
FQDN Fully Qualified Domain Name
IPX IP exchange Service
NF Network Function
MNC Mobile Network Code MCC Mobile Country Code
PLMN Public Land Mobile Network
pNF Producer NF
pSEPP Producer SEPP
SBI Service Based Interface
SEPP Secure Edge protection Proxy
TLS Transport Layer Security

The invention claimed is:

1. A method by a first security edge protection proxy, SEPP, for security edge protection of messages being communicated between first and second communications networks of a communications system, the method comprising:
receiving, from a first network function of the first communications network, a first message containing an address identifying a second network function which is located in the second communications network;
receiving, from a second SEPP operating to protect communications with the second communications network, a second message containing a fully qualified domain name, FQDN, reference for a combination of the second SEPP and the second network function;
storing the FQDN reference for the combination of the second SEPP and second network function in a label-to-FQDN mapping data structure with a logical association to a substitute locally-unique label; and
sending a third message containing the substitute locally-unique label to the first network function.

2. The method of claim 1, further comprising:
selecting the substitute locally-unique label to be stored with a logical association to the FQDN reference for the combination of the second SEPP and the second network function, based on a certificate rule.

3. The method of claim 1, further comprising:
generating the substitute locally-unique label to be stored with a logical association to the FQDN reference for the combination of the second SEPP and the second network function, based on a randomly generated locally unique string.

4. The method of claim 1, further comprising:
generating the substitute locally-unique label to be stored with a logical association to the FQDN reference for the combination of the second SEPP and the second network function, based on a combination of a foreign public land mobile network, PLMN, mobile network code, MNC, and mobile country code, MCC, combined with a counter.

5. The method of claim 1, further comprising:
generating the substitute locally-unique label to be stored with a logical association to the FQDN reference for the combination of the second SEPP and the second network function, based on a hash of the FQDN reference for the combination of the second SEPP and second network function.

6. The method of claim 1, wherein the step of sending the third message containing the substitute locally-unique label to the first network function, comprises:
appending the substitute locally-unique label to a FQDN of the first SEPP.

7. The method of claim 6, wherein:
the substitute locally-unique label is appended as a first element of the FQDN of the first SEPP.

8. The method of claim 1,
wherein the first message comprises a service discovery message;
wherein the second message comprises a service reply message; and
further comprising:
receiving, from the first network function, a service request message containing the substitute locally-unique label;
identifying the FQDN reference for the combination of the second SEPP and the second network function using the substitute locally-unique label from the service request message as a look-up pointer within the label-to-FQDN mapping data structure;
replacing the substitute locally-unique label in the service request message with the FQDN reference for the combination of the second SEPP and the second network function to generate a modified service request message; and
sending the modified service request message to second SEPP to request service by the second network function.

9. The method of claim 1, wherein:
the first message is a service discovery request message; and
the second message is a service discovery reply message.

10. The method of claim 9,
wherein the first message is received from a first network repository function, NRF, of the first communications system as a service discovery request for the first network function;
further comprising sending the service discovery request through the second SEPP to a second NRF of the second communications system; and
wherein the second message is received from the second SEPP as the reply message for the NRF for the second network function.

11. The method of claim 1, wherein:
the first communications network is a visited public land mobile network; and
the second communications network is a home public land mobile network.

12. The method of claim 1, wherein:
the first network function is a network access control and mobility management function, AMF.

13. The method of claim 1, wherein:
the second network function is a unified data management, UDM, function.

14. The method of claim 1, further comprising:
setting up a transport layer security, TLS, connection between the first SEPP and the first network function.

15. The method of claim 14, further comprising:
authenticating the TLS connection toward the first network function using a wildcard certificate for the substitute locally-unique label.

16. A first security edge protection proxy, SEPP, network node (600) for security edge protection of messages being communicated between first and second communications networks of a communications system, the network node comprising:
a processor; and
a memory coupled to the processor, wherein the memory stores instructions that when executed by the processor causes the processor to perform operations according to claim 1.

17. A computer program product, comprising:
a non-transitory computer readable storage medium comprising computer readable program code embodied in the medium that when executed by a processor of a network node causes the processor to perform operations according to claim 1.

* * * * *

UNITED STATES PATENT AND TRADEMARK OFFICE
CERTIFICATE OF CORRECTION

PATENT NO. : 11,895,735 B2
APPLICATION NO. : 17/288426
DATED : February 6, 2024
INVENTOR(S) : Ben Henda et al.

It is certified that error appears in the above-identified patent and that said Letters Patent is hereby corrected as shown below:

In the Specification

In Column 7, Lines 48-49, delete ""rewritten pNF.foreign_network.tld"." and insert -- "rewritten_pNF.foreign_network.tld". --, therefor.

In Column 17, Line 19, delete "(SOC)." and insert -- (SoC). --, therefor.

In Column 25, Line 27, delete "(SIM/RUIM) module," and insert -- module (SIM/RUIM), --, therefor.

In the Claims

In Column 34, Line 52, in Claim 16, delete "node (600)" and insert -- node --, therefor.

Signed and Sealed this
Twenty-ninth Day of October, 2024

*Katherine Kelly Vidal*
Katherine Kelly Vidal
*Director of the United States Patent and Trademark Office*